United States Patent
Doser et al.

(10) Patent No.: US 9,432,554 B2
(45) Date of Patent: *Aug. 30, 2016

(54) METHODS AND SYSTEMS FOR DISPLAYS WITH CHROMATIC CORRECTION HAVING DIFFERING CHROMATIC RANGES

(75) Inventors: Ingo Tobias Doser, Villingen-Schwenningen (DE); Jurgen Stauder, Montreuil sur Ille (FR); Bongsun Lee, La Crescenta, CA (US)

(73) Assignee: THOMSON LICENSING, Issy les-Moulineaux (FR)

( * ) Notice: Subject to any disclaimer, the term of this patent is extended or adjusted under 35 U.S.C. 154(b) by 1487 days.

This patent is subject to a terminal disclaimer.

(21) Appl. No.: 12/450,621

(22) PCT Filed: Dec. 14, 2007

(86) PCT No.: PCT/FR2007/052528
§ 371 (c)(1),
(2), (4) Date: Aug. 5, 2010

(87) PCT Pub. No.: WO2008/122702
PCT Pub. Date: Oct. 16, 2008

(65) Prior Publication Data
US 2010/0289810 A1 Nov. 18, 2010

Related U.S. Application Data

(60) Provisional application No. 60/921,579, filed on Apr. 3, 2007.

(51) Int. Cl.
*G09G 5/00* (2006.01)
*G09G 5/10* (2006.01)
(Continued)

(52) U.S. Cl.
CPC .............. *H04N 1/6058* (2013.01); *G09G 5/02* (2013.01)

(58) Field of Classification Search
USPC .................. 345/581, 589–591, 690, 1.2, 3.1, 345/600–604, 606, 617–620, 548–549, 204, 345/63, 87–88; 348/254, 552, 560, 675; 358/518, 519, 523, 525; 382/162–167, 382/254, 260, 274, 276
See application file for complete search history.

(56) References Cited

U.S. PATENT DOCUMENTS 5,212,546 A 5/1993 Arazi et al.
5,333,069 A 7/1994 Spence
(Continued)

FOREIGN PATENT DOCUMENTS

DE 10023270 5/2002
EP 1578140 9/2005
(Continued)

OTHER PUBLICATIONS

International Search Report, dated Aug. 27, 2008.
(Continued)

*Primary Examiner* — Wesner Sajous
(74) *Attorney, Agent, or Firm* — Brian J. Dorini; Lily Neff

(57) ABSTRACT

There are provided methods and systems for color correcting displays with different color gamuts. A method includes performing an initial color correction on source picture content using a reference type display having a reference color gamut to obtain mastered color corrected picture content for display on reference type displays having the reference color gamut. The method further includes determining a first set of metadata defining a color gamut mapping specification for a color gamut mapping from a non-reference type display having a non-reference color gamut to the reference type display. The method also includes performing a subsequent color correction using the non-reference type display and the mastered color corrected picture content to create a second set of metadata directed to non-reference type displays having the non-reference color gamut. The method additionally includes generating a final set of metadata from the first set of metadata and the second set of metadata, for a subsequent color transform that color transforms the mastered color corrected picture content for display on non-reference type displays for consumer consumption. The source picture content is mastered for consumer consumption only for the reference type displays having the reference color gamut.

64 Claims, 9 Drawing Sheets

(51) Int. Cl.
*G03F 3/08* (2006.01)
*G06K 9/00* (2006.01)
*G06K 9/40* (2006.01)
*H04N 5/202* (2006.01)
*H04N 5/44* (2011.01)
*H04N 7/00* (2011.01)
*H04N 1/60* (2006.01)
*G09G 5/02* (2006.01)

(56) References Cited

U.S. PATENT DOCUMENTS

| | | |
|---|---|---|
| 5,502,458 A | 3/1996 | Braudaway et al. |
| 5,668,890 A | 9/1997 | Winkelman |
| 5,754,184 A | 5/1998 | Spaulding et al. |
| 6,268,939 B1 | 7/2001 | Klassen et al. |
| 6,282,312 B1 | 8/2001 | McCarthy et al. |
| 6,560,358 B1 | 5/2003 | Tsukada |
| 6,754,384 B1 | 6/2004 | Spaulding et al. |
| 6,771,323 B1 | 8/2004 | Dean et al. |
| 6,775,407 B1 | 8/2004 | Gindele et al. |
| 6,822,760 B1 | 11/2004 | Spaulding et al. |
| 6,897,876 B2* | 5/2005 | Murdoch et al. ............ 345/589 |
| 6,947,589 B2* | 9/2005 | Newman et al. ............ 382/162 |
| 7,403,304 B2 | 7/2008 | Andreas et al. |
| 8,149,338 B2 | 4/2012 | Rehm et al. |
| 2002/0120781 A1 | 8/2002 | Hirashima et al. |
| 2003/0053683 A1* | 3/2003 | Newman et al. ............ 382/162 |
| 2004/0105581 A1 | 6/2004 | Sawada |
| 2004/0263528 A1* | 12/2004 | Murdoch et al. ............ 345/600 |
| 2005/0089189 A1 | 4/2005 | Langelaar |
| 2005/0147295 A1 | 7/2005 | Kim et al. |
| 2005/0152597 A1* | 7/2005 | Spaulding et al. .......... 382/162 |
| 2005/0152612 A1* | 7/2005 | Spaulding et al. .......... 382/254 |
| 2006/0096483 A1 | 5/2006 | Andreas et al. |
| 2006/0103861 A1* | 5/2006 | Klassen et al. ............. 358/1.9 |
| 2007/0121132 A1* | 5/2007 | Blinn et al. ................. 358/1.9 |
| 2007/0211074 A1* | 9/2007 | Yeung ......................... 345/604 |
| 2007/0291179 A1 | 12/2007 | Sterling et al. |
| 2009/0080769 A1* | 3/2009 | Kagawa et al. ............ 382/162 |
| 2009/0102968 A1* | 4/2009 | Doser et al. ................ 348/467 |
| 2009/0109344 A1 | 4/2009 | Ollivier et al. |
| 2009/0174726 A1 | 7/2009 | Ollivier |
| 2009/0201309 A1* | 8/2009 | Demos ........................ 345/589 |
| 2009/0238456 A1* | 9/2009 | Fukasawa ................... 382/167 |
| 2009/0284554 A1 | 11/2009 | Doser |
| 2010/0128976 A1* | 5/2010 | Stauder et al. ............. 382/162 |
| 2010/0134529 A1 | 6/2010 | Doser et al. |
| 2010/0135419 A1 | 6/2010 | Doser et al. |
| 2010/0157154 A1* | 6/2010 | Kobayashi et al. ........ 348/557 |
| 2010/0220237 A1* | 9/2010 | Doser et al. ................ 348/649 |
| 2010/0265264 A1 | 10/2010 | Doser et al. |
| 2010/0289810 A1 | 11/2010 | Doser et al. |
| 2011/0154426 A1 | 6/2011 | Doser et al. |

FOREIGN PATENT DOCUMENTS

| | | |
|---|---|---|
| JP | 06208360 | 7/1994 |
| JP | 1994208360 | 7/1994 |
| JP | 07135635 | 5/1995 |
| JP | 08037604 | 2/1996 |
| JP | 1996037604 | 2/1996 |
| JP | 09270925 | 10/1997 |
| JP | 1997270925 | 10/1997 |
| JP | 11017868 | 1/1999 |
| JP | 1999017868 | 1/1999 |
| JP | 2002116750 | 4/2002 |
| JP | 2002218262 | 8/2002 |
| JP | 2003169220 | 6/2003 |
| JP | 2003241732 | 8/2003 |
| JP | 2004282599 | 10/2004 |
| JP | 2005176361 | 6/2005 |
| WO | WO2006050305 | 5/2006 |

OTHER PUBLICATIONS

Hitachi Ltd., "High-Definition Multimedia Interface", Specification Version 1.3a, Nov. 10, 2006.

Office Action for U.S. Appl. No. 12/450,622 mailed Feb. 20, 2013, Aug. 28, 2013.

Office Action for U.S. Appl. No. 12/450,637 mailed Mar. 20, 2012, Oct. 15, 2012, Sep. 27, 2013.

Notice of Allowance issued for U.S. Appl. No. 12/450,622 maed Aug. 18, 2014.

Office Action for U.S. Appl. No. 12/450,622 dated Dec. 30, 2013.

Di-lice Actions for U.S. Appl. No. 12/450,637 mailed Mar. 20, 2012 and Sep. 27, 2013.

Office Action for U.S. Appl. No. 12/450,637 mailed Oct. 15, 2012.

* cited by examiner

METHODS AND SYSTEMS FOR DISPLAYS WITH CHROMATIC CORRECTION HAVING DIFFERING CHROMATIC RANGES

This application claims the benefit, under 35 U.S.C. §365 of International Application PCT/FR2007/052528, filed Dec. 14, 2007, which was published in accordance with PCT Article 21(2) on Oct. 16, 2008 in French and which claims the benefit of U.S. provisional patent application No. 60/921,579, filed Apr. 3, 2007.

The present principles relate generally to television displays and, more particularly, to methods and systems for color correcting to provide predictable results on displays with different color gamuts.

In today's motion picture industry, colors of motion picture content are mostly graded for displays with a single color gamut defined by cathode ray tube (CRT) phosphor colors, corresponding to either the European Broadcasting Union (EBU) or the Society of Motion Picture and Television Engineers color standard (SMPTE-C) for Standard Definition, and the International Telecommunication Union (ITU) 709 colors for High Definition. These are the current standards for use in determining the reference color gamut (RCG) for displays. However, displays with non-standard color gamuts are currently prevalent among consumers of motion picture content.

When editing the colors of a picture on a display with a reference color gamut other than the color gamut of the target display, the resultant colors may look dissatisfying on the target display. To illustrate cases where the resultant colors may look dissatisfying, the following two cases are described.

The first case relates to consumer displays having color gamuts roughly the same size as the reference display, but the display primaries are not equal to the display primaries of the reference display during content creation. In such circumstances, it is desirable to ensure that the colors can be accurately represented on the consumer displays.

The second case relates to the current existence of wide gamut color displays being utilized in the field. In such circumstances, no methods exist to color correct consumer displays with respect to these wide gamut color displays. For example, such consumer displays may use a different reference color gamut but may or may not be capable of even displaying colors in accordance with the wide gamut color standards.

There is an analogy to the situation when color television was initially introduced in the United States. A lot of different sets of primaries were being utilized at that time that would not allow for a unified colorimetric. However, the stockpiling by one of the primary television manufacturers of a significant amount of phosphors produced by a particular phosphor manufacturer resulted in the effective formation of a quasi standard and, then, ultimately a standard (SMPTE-C). However, the Federal Communications Commission (FCC) never adopted this and the television manufacturing industry had to live with this dichotomy. There were attempts by the Society of Motion Picture and Television Engineers (SMPTE) to emulate National Television System Committee (NTSC) colors on a SMPTE-C monitor which eventually failed due to technology reasons at that time.

The color gamut of a display is determined by the display technology chosen. At this moment, a consumer has the choice between the following technologies (also referred to herein as "display type") including, for example, liquid crystal display (LCD), Plasma, cathode ray tube (CRT), digital light processing (DLP), and silicon crystal reflective display (SXRD). However, there can be significant differences between different display technologies, as well as between two representatives of the same display technology. For example, two liquid crystal display sets can be equipped with different sets of light sources. One of these sets of light sources may be cold cathode fluorescent lights (CCFL), where the color gamut mainly depends on the phosphors used. Historically, these light sources did not permit the use of a high color gamut. In fact, displays that used these light sources could not reproduce all 709 colors, as per the International Telecommunication Union (ITU) 709 color standard for high definition. However, recent developments have brought products to market that use so-called wide gamut cold cathode fluorescent lights (W-CCFL), where the color gamut is even larger than the 709 color gamut. Another component of liquid crystal display technology is the color filters, which could be designed to have a high light output and, thus, a high light efficiency with a narrow color gamut, or could be designed to have a luminous light efficiency and a wider color gamut. Another trend is that LCD display's CCFL back light units (BLU's) get replaced by RGB LED (Light Emitting Diodes) BLU's with an even higher color gamut.

Digital light processing displays and silicon crystal reflective displays (including rear projection) displays are reflective displays that filter light coming from a light source. Currently, there are different techniques to increase the color gamut of those devices. In fact, as of today, some of the displays employing these different techniques already have an increased color gamut compared to the current applicable reference color gamut.

With the advent of wide gamut displays, it has become possible to display a wider range of colors than was previously possible. The current video content on digital video disks (DVD's), television broadcasts, and/or via video over Internet Protocol (VOIP), are encoded in a color space with a reference color gamut and, thus, follow the rules that were set many years ago when wide gamut color display was not feasible. In fact, until recently it was difficult to achieve a reproduction even of the current reference color gamut.

As it looks today, the situation has changed. An extended color gamut is feasible and there is a desire to utilize the wider color gamut. However, instead of choosing another set of wide color gamut primaries, the current trend that seems to be preferred is the use of open, unrestrictive color standards. One example of such standard is XYZ for Digital Cinema, or xvYCC (IEC 61966-2-3) for consumer television. Other examples include, for example, sYCC (International Electrotechnical Commission (IEC) 61966-2-1), ITU-R BT.1361, or e-sRGB (Photographic and Imaging Manufacturers Association (PIMA) 7667) for computer graphics and still picture photography.

At the same time, there is significant variation in the color gamuts used in various displays currently available. Until recently, the color gamut was determined more or less by the standard cathode ray tube phosphors. Today, the range of colors capable of being displayed depends on the display technology used and the hardware design, as described above. Turning to FIG. 1, color gamut measurements of currently available displays are indicated generally by the reference numeral 100. As is evident, there currently exists a significant amount of differences between the current available color gamut measurements 100. It is to be noted that none of the color gamuts of the various available displays are equal to the reference color gamy of the source material which, in this example, corresponds to ITU-R Bt.

709. With respect to FIG. 1, the display with the widest color gamut was a liquid crystal on silicon (LCOS) display under test, with a yellowish Green, and a liquid crystal display (LCD) with a wide gamut backlight with a cyanic Green.

Additionally, current displays seem to simply replace the reference color primaries specified by the applicable standard by the color primaries corresponding to the respective display (e.g., respective display type, respective color gamut implemented on that display, and so forth), similar to the past and the use of different cathode ray tube phosphors. As a consequence, colors do not appear as they should. That is, colors appear different than what they were intended to appear like. For instance, fir trees look like pine trees, tomatoes look like oranges, and so forth. However, mapping primaries is the most primitive and cheapest way of gamut mapping.

In the case of wide gamut material on a wide gamut display, there still is a problem where colors may be displayed incorrectly due to the color gamut of the wide gamut material being different than the color gamut of the wide gamut display. In fact, by using the above mentioned unrestrictive color standards like xvYCC or XYZ, it is always possible that a color gets transmitted that cannot be displayed on one or more particular wide gamut displays.

One method for color correction involves 3×3 matrixing the source primaries to the display primaries (which, however, requires a prior video signal linearization). This solution has problems when colors are transmitted that are beyond the color gamut of the display color gamut. As an example, consider a display with three primaries of Red, Green, and Blue, where the color to be displayed may be a Green color (e.g., a variation of the primary color Green), and that color may be out of the display range. The typical result of such a situation is that the color to be displayed may get clipped to their respective maximum ranges. The problem will manifest in a wrong color reproduction, in a hue, saturation, and also brightness error. The detrimental affect will be even worse if the color appears in a gradation (e.g., as seen most often in animated movies), as a false contour will also appear. A false contour is the appearance of an erroneous structure or object in the picture as a result of artifacts in the video signal processing or in the display.

Consider another example, as follows. A "cyanish" white color is defined as follows: Blue=Max; Red=0.8*Max; and Green=Max; on a wide gamut display, where "max" represents the maximum permissible value. On a narrow gamut display that has less saturated Blue, this will result in a chipping of Blue, and the White will become Greenish. This problem is illustrated in FIG. 3. Turning to FIG. 3, a hue change on a bluish white graduation due to color gamut restriction is indicated generally by the reference numeral 300. In particular, the desired result is shown on the left portion of FIG. 3 and is designated by the reference numeral 310, while the actual result is shown on the right portion of FIG. 3 and is designated by the reference numeral 350. As indicated by the reference numeral 380 and the corresponding text, White turns Yellow due to clipping in Blue.

It is therefore essential that a proper way of color gamut mapping is used for rendering colors on the display used. Turning to FIG. 2, an example color gamut mapping is indicated generally by the reference numeral 200. FIG. 2 shows a "Color Gamut 1" and a "Color Gamut 2" as a cross section, where "Color Gamut 1" is mapped into "Color Gamut 2" by means of color gamut mapping. In the color gamut mapping 100, variation in luminance is shown with respect to the vertical axis (typically denoted as the Y axis), and variance in chrominance is shown with respect to the horizontal axis (typically denoted as the X axis). The provided example is for a "Color Gamut 2" smaller than "Color Gamut 1". However, it is to be appreciated that the opposite case is also possible, where "Color Gamut 2" is larger than "Color Gamut 1".

Turning to FIG. 4, an exemplary high-level diagram showing the workflow for color correction using a display having a reference color gamut for content that may be subsequently displayed on a display with a different color gamut than the reference color gamut is indicated generally by the reference numeral 400.

The undesirable result of the color correction workflow 400 of FIG. 4 is that when color correcting on a display with a reference color display (RCG), the colors on a display with a second color gamut or color gamut 2 (CG2) will be reproduced incorrectly.

The color correction workflow 400 involves a content creation side 480 and a content consumer side 490. A RCG display 482 is used on the content creation side 480. A RCG display 492 and a CG2 display 494 are used on the content consumer side 590.

The picture source content may be stored, for example, in a picture source content store 420. The color corrected picture content may be stored, for example, in a color corrected picture content store 440.

A color correction module 430 generates the content that only looks correct on a display of the same type and with the same color gamut. Thus, the colors on the CG2 display will not look the same as the colors that were color corrected on the RCG display. It is very likely that at least some of the colors on the RCG2 display will be clipped and at least some with be displayed with the wrong hue.

The problem is illustrated in FIG. 4 using the "Ski Image", which is part of the CIE TC8-03 test images in their "Guidelines for the Evaluation of Gamut Mapping Algorithms". It is courtesy of Fujifilm Electronic Imaging Ltd. (UK). As we can see, on the content consumer side, the picture can only be retrieved correctly on a display with RCG. The picture will look incorrect and it will show the above mentioned artifacts if a display with a color gamut not equal to the RCG (CG2) is used for display.

These and other drawbacks and disadvantages of the prior art are addressed by the present principles, which are directed to methods and systems for color correcting to provide predictable results on displays with different color gamuts.

According to an aspect of the present principles, there is provided a method for color correcting. The method includes performing an initial color correction on source picture content using a reference type display having a reference color gamut to obtain mastered color corrected picture content for display on reference type displays having the reference color gamut. The method further includes determining a first set of metadata defining a color gamut mapping specification for a color gamut mapping from a non-reference type display having a non-reference color gamut to the reference type display. The method also includes performing a subsequent color correction using the non-reference type display and the mastered color corrected picture content to create a second set of metadata directed to non-reference type displays having the non-reference color gamut. The method additionally includes generating a final set of metadata from the first set of metadata and the second set of metadata, for a subsequent color transform that color transforms the mastered color corrected picture content for display on non-reference type displays for consumer consumption. The source picture content is mastered for consumer consumption only for the reference type displays having the reference color gamut.

According to another aspect of the present principles, there is provided a method for color correcting. The method includes performing an initial color correction on source picture content using a non-reference type display having a non-reference color gamut to obtain mastered color corrected picture content for display on non-reference type displays having the non-reference color gamut and to obtain initial color correction data directed to reference type displays having a reference color gamut. The method further includes performing a color gamut mapping using the initial color correction data and the mastered color corrected picture content to modify the mastered color corrected picture content for display on a reference type display having the reference color gamut. The method also includes performing a subsequent color correction using the reference type display having the reference color gamut and the modified mastered color corrected picture content to obtain mastered color corrected picture content for display on the reference type displays having the reference color gamut.

According to yet another aspect of the present principles, there is provided a method for color correcting. The method includes performing an initial color correction on source picture content using a reference type display having a reference color gamut to obtain mastered color corrected picture content for display on reference type displays having the reference color gamut. The method further includes performing a subsequent color correction using a non-reference type display having a non-reference color gamut and the mastered color corrected picture content to create a first set of metadata directed to non-reference type displays having the non-reference color gamut. The method also includes determining a second set of metadata defining a color gamut mapping specification from a non-reference type display to the reference type display. The method additionally includes generating a final set of metadata from the first set of metadata and the second set of metadata, for a subsequent color transform that color transforms the mastered color corrected picture content for display on non-reference type displays for consumer consumption. The source picture content is mastered for consumer consumption only for the reference type displays having the reference color gamut.

According to still another aspect of the present principles, there is provided a method for color correcting. The method includes performing an initial color correction on source picture content using a reference type display having a reference color gamut to obtain mastered color corrected picture content for display on reference type displays having the reference color gamut. The method further includes performing a subsequent color correction using a non-reference type display having a non-reference color gamut and the mastered color corrected picture content for display on the reference type displays having the reference color gamut to obtain subsequent color correction data. The method also includes performing a color gamut mapping using the subsequent color correction data and the mastered color corrected picture content for display on reference type displays having the reference color gamut to obtain mastered color corrected picture content for display on non-reference type displays having the non-reference color gamut.

According to a further aspect of the present principles, there is provided a system for color correcting. The system includes a color correction module for performing an initial color correction on source picture content using a reference type display having a reference color gamut to obtain mastered color corrected picture content for display on reference type displays having the reference color gamut. The system further includes a color gamut mapping module for performing a color gamut mapping to generate a first set of metadata defining a color gamut mapping specification for a color gamut mapping from a non-reference type display having a non-reference color gamut to the reference type display. The system also includes a subsequent color correction module for performing a subsequent color correction using the non-reference type display and the mastered color corrected picture content to create a second set of metadata directed to non-reference type displays having the non-reference color gamut. The system additionally includes a final set metadata generator for generating a final set of metadata from the first set of metadata and the second set of metadata, for a subsequent color transform that color transforms the mastered color corrected picture content for display on non-reference type displays for consumer consumption. The source picture content is mastered for consumer consumption only for the reference type displays having the reference color gamut.

According to a still further aspect of the present principles, there is provided a system for color correcting. The system includes a color correction module for performing an initial color correction on source picture content using a non-reference type display having a non-reference color gamut to obtain mastered color corrected picture content for display on non-reference type displays having the non-reference color gamut and to obtain initial color correction data directed to reference type displays having a reference color gamut. The system further includes a color gamut mapping module for performing a color gamut mapping using the initial color correction data and the mastered color corrected picture content to modify the mastered color corrected picture content for display on a reference type display having the reference color gamut. The system also includes a subsequent color correction module for performing a subsequent color correction using the reference type display having the reference color gamut and the modified mastered color corrected picture content to obtain mastered color corrected picture content for display on the reference type displays having the reference color gamut.

According to a yet further aspect of the present principles, there is provided a system for color correcting. The system includes a color correction module for performing an initial color correction on source picture content using a reference type display having a reference color gamut to obtain mastered color corrected picture content for display on reference type displays having the reference color gamut. The system further includes a subsequent color correction module for performing a subsequent color correction using a non-reference type display having a non-reference color gamut and the mastered color corrected picture content to create a first set of metadata directed to non-reference type displays having the non-reference color gamut. The system also includes a color gamut mapping module for performing a color gamut mapping to generate a second set of metadata defining a color gamut mapping specification from a non-reference type display to the reference type display. The system additionally includes a final set metadata generator for generating a final set of metadata from the first set of metadata and the second set of metadata, for a subsequent color transform that color transforms the mastered color corrected picture content for display on non-reference type displays for consumer consumption. The source picture content is mastered for consumer consumption only for the reference type displays having the reference color gamut.

According to an additional aspect of the present principles, there is provided a system for color correcting. The system includes a color correction module for performing an initial color correction on source picture content using a reference type display having a reference color gamut to obtain mastered color corrected picture content for display on reference type displays having the reference color gamut. The system further includes a subsequent color correction module for performing a subsequent color correction using a non-reference type display having a non-reference color gamut and the mastered color corrected picture content for display on the reference type displays having the reference color gamut to obtain subsequent color correction data. The system also includes a color gamut mapping module for performing a color gamut mapping using the subsequent color correction data and the mastered color corrected picture content for display on reference type displays having the reference color gamut to obtain mastered color corrected picture content for display on non-reference type displays having the non-reference color gamut.

These and other aspects, features and advantages of the present principles will become apparent from the following detailed description of exemplary embodiments, which is to be read in connection with the accompanying drawings.

The present principles may be better understood in accordance with the following exemplary figures, in which.

Figure 8:
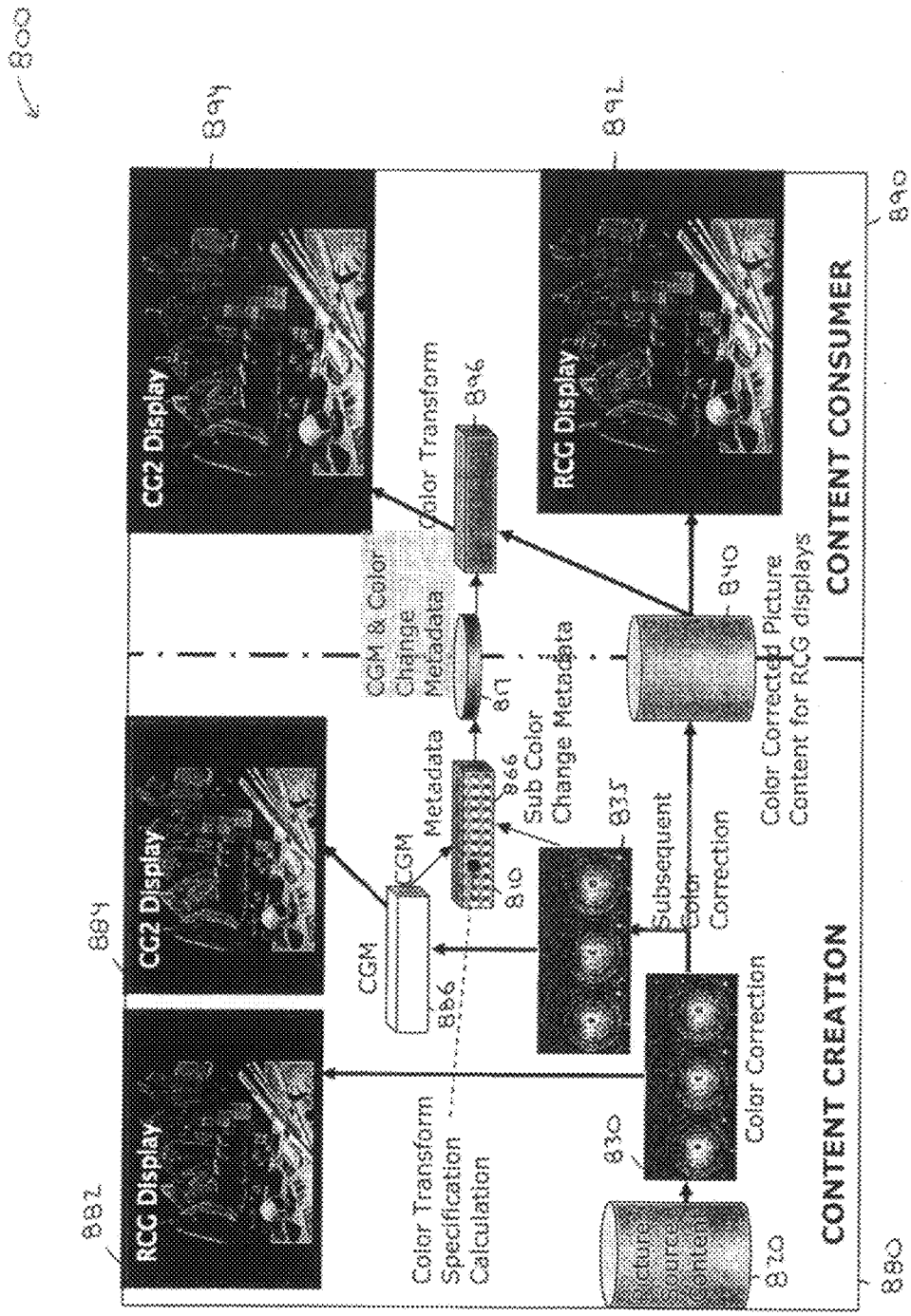
Figure 9:
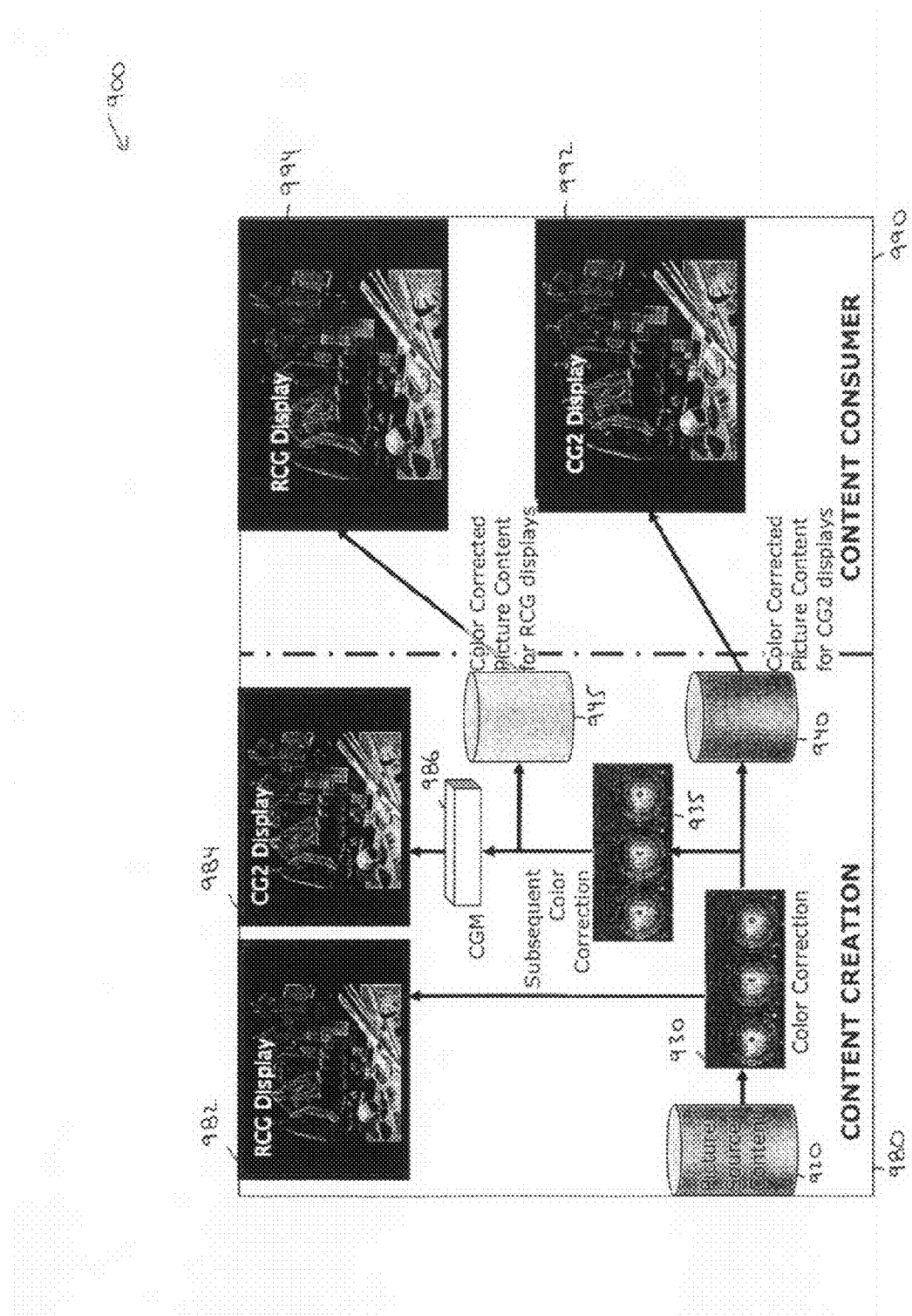

FIG. 8 is a high-level diagram showing another exemplary workflow for color correction to obtain a master for RCG displays and metadata for CG2 displays, in accordance with an embodiment of the present principles; and FIG. 9 is a high-level diagram showing another exemplary workflow for color correction to obtain a master for RCG displays and a master for CG2 displays, in accordance with an embodiment of the present principles.

The present principles are directed to methods and systems for color correcting to provide predictable results on displays with different color gamuts.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

As used herein, the acronym "CG" denotes "color gamut", the acronym "CGM" denotes "color gamut mapping", the acronym "RCG" denotes "reference color gamut", and the acronym "CG2" denotes "color gamut 2".

Also, as used herein, the phrase "RCG displays" refers to displays having a gamut type denoted as a reference color gamut (RCG), while the phrase "CG2 displays" refers to displays having a gamut type denoted as a second color gamut, the second color gamut being different than the reference color gamut.

It is to be appreciated that while the disclosure provided herein is substantially described with respect to, for example, a picture version for RCG displays, and a picture version for CG2 displays, or metadata for reconstructing the picture for CG2 displays, given the variety of available consumer displays, more than one CG2 version may be generated, while maintaining the spirit of the present principles.

Moreover, as used herein, the phrase "709 color gamut" and variations thereof denote 709 colors which, in turn, denote, the color cube defined by the three phosphor primaries and the white point defined in ITU-R Bt.709.

Also, as used herein, with respect to the transmission and receipt of metadata, the phrase "in-band" refers to the transmitting and/or receiving of such metadata together with the color corrected picture content to be displayed by a consumer device. In contrast, the phrase "out-of-band" refers to the transmitting and/or receiving of the metadata separately with respect to the color corrected picture content to be displayed by a consumer device.

Further, as used herein, the phrases "color correction" and "color grading" interchangeably refer to the creative process during post production to tune colors so that the picture expresses the creative intent.

Additionally, as used herein, the phrase "master" refers to mastered display content, where the display content is mastered for a particular color gamut such as, for example, RCG or CG2.

Also, as used herein, the term "metadata" refers to data such as, for example, integer, non-integer values, and/or Boolean values, used to control, turn on or turn off color processing mechanisms, and to modify the functionality of such. Furthermore, metadata may include a specification of a mapping table.

For example, in an embodiment, a color mapping table could be realized by means of a 3-D LUT (three-dimensional Look Up Table). This LUT is used to receive three input values, each value representing one color component, Red, Green, or Blue, and producing a predefined triplet of output values, e.g., Red, Green, and Blue, for each individual Red, Green, and Blue input triplet. In this case, the metadata from content creation to consumer would then include a LUT specification.

Another embodiment may involve the specification of a mapping function such as, for example, circuitry and/or so forth for performing a "GOG" (Gain, Offset, Gamma), which is defined as follows:

$$V_{out} = Gain*(Offset+V_{in})^{Gamma}, \text{ for each color component.}$$

In this case, the metadata would include 9 values, one set of Gain, Offset, and Gamma for each of the three color components.

Of course, the present principles are not limited to the preceding embodiments and, given the teachings of the present principles provided herein, other embodiments involving other implementations of metadata are readily contemplated by one of ordinary skill in this and related arts, while maintaining the spirit of the present principles.

Moreover, as used herein, the phrase "color correction" refers to a creative procedure to manually choose the right (preferred) colors on the content creation side (versus the consumer consumption side). Accordingly, the phrase "color correction module" and similar phrases refer to the structure required for a colorist to manually correct such colors. Thus, such structure may involve an interface presented to the colorist such as a graphical user interface (GUI), selection means for allowing the colorist to make selections regarding, for example, colors to be replaced and/or modified, and implementing means for implementing the selections made by the colorist. The selection means may include one or more of the following: a keyboard; a keypad; a mouse; buttons; switches; and so forth.

As noted above, the present principles are directed to a method and system for color correcting to provide predictable results on displays with different color gamuts. The present principles correct differences in colors between different target displays. It is to be appreciated that the present principles are directed to current content (e.g., encoding types and technologies) and displays (e.g., display types, and differences between the same, as well as different display types, resulting from, for example, hardware, software, and so forth) as well as future content and displays, as they relate to the use of different color gamuts.

In an embodiment, the present principles may be used to address an exemplary problem where color correction is to be performed on a display with a reference color gamut, however, the corrected colors are to be displayed on a display with a different color gamut than the reference color gamut used for color correction.

Figure 1:
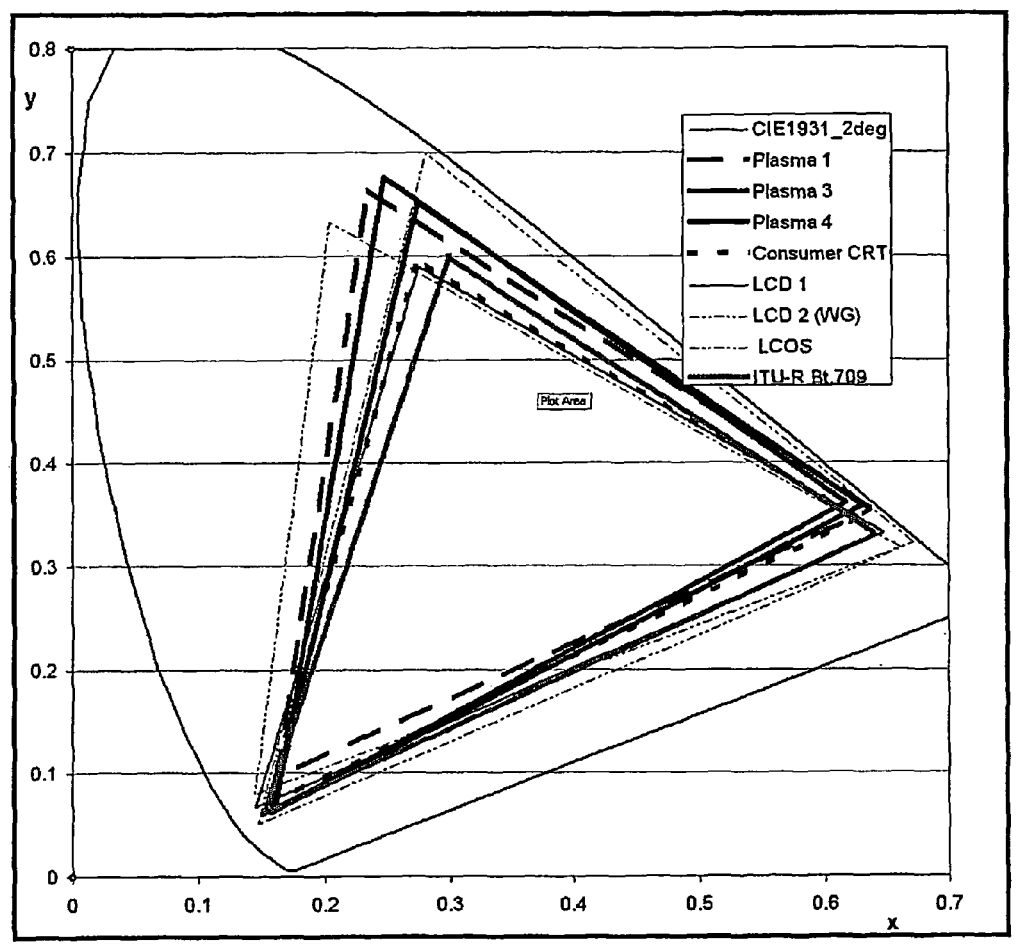
FIG. 1 is a diagram showing color gamut measurements of currently available displays, in accordance with the prior art.
Figure 2:
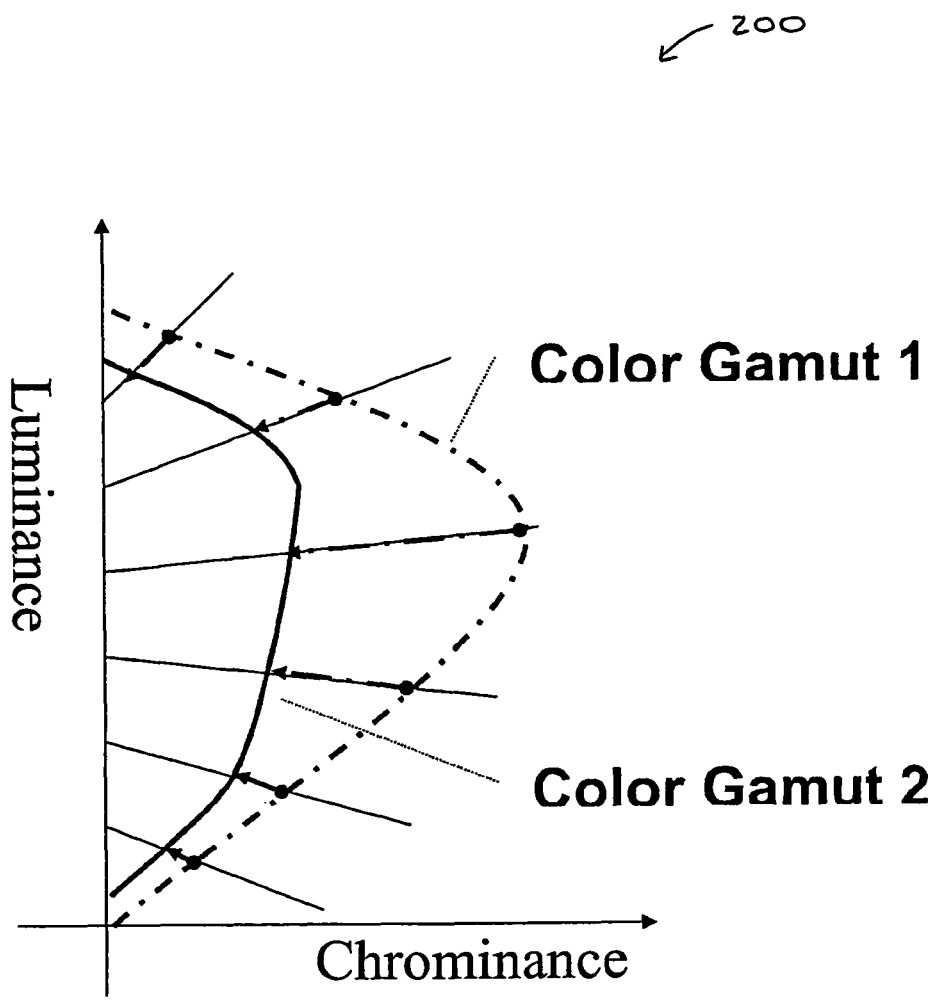
FIG. 2 is a diagram showing an example color gamut mapping, in accordance with the prior art.
Figure 3:
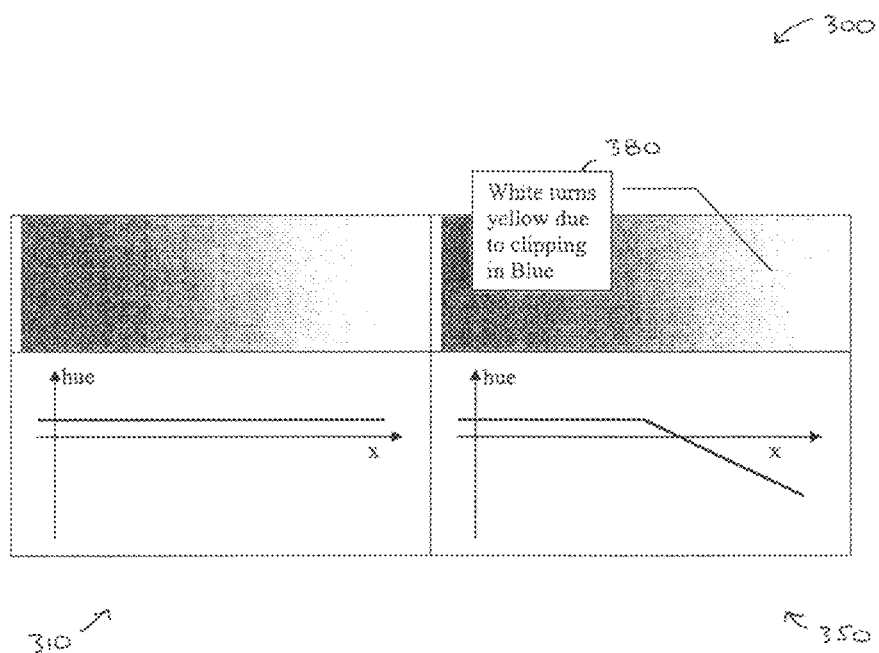
FIG. 3 is a diagram showing a hue change on a bluish white graduation due to color gamut restriction, in accordance with the prior art.
Figure 4:
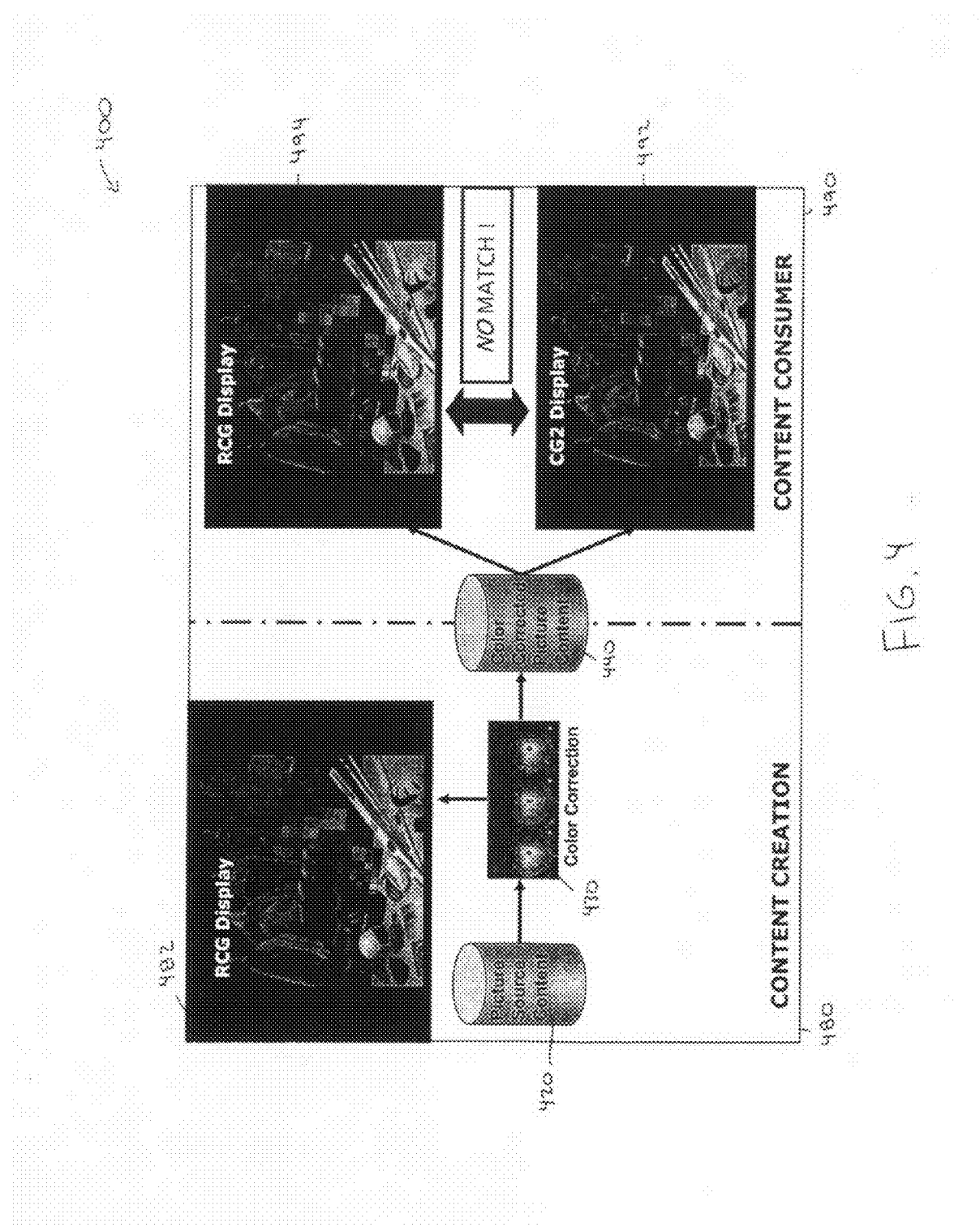
FIG. 4 is a high-level diagram showing the exemplary workflow for color correction using a display having a reference color gamut for content that may be subsequently displayed on a display with a different color gamut than the reference color gamut, in accordance with the prior art.
Figure 5:
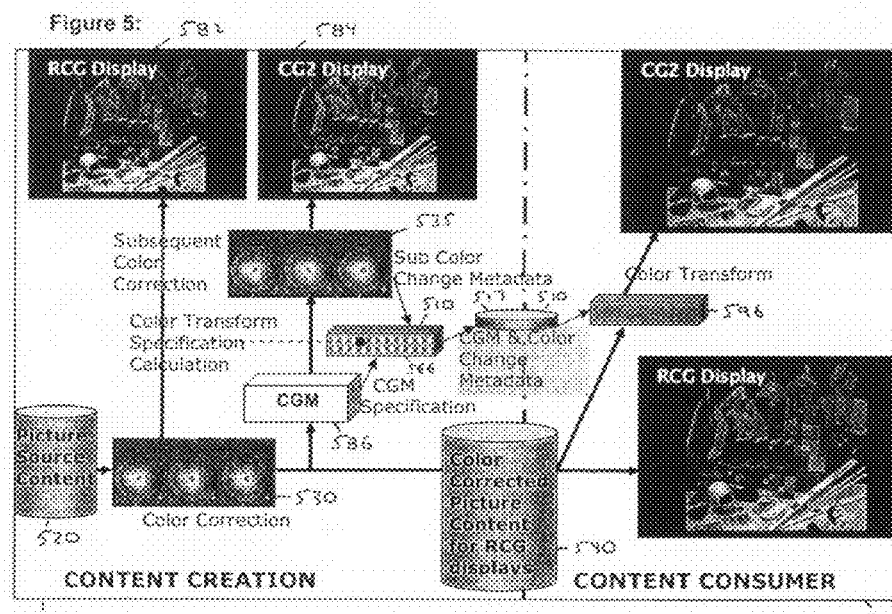
FIG. 5 is a high-level diagram showing the exemplary workflow for color correction to obtain a master for RCG displays and metadata for CG2 displays, in accordance with an embodiment of the present principles.

Turning to FIG. 5, a high-level diagram showing the exemplary workflow for color correction to obtain a master for RCG displays and metadata for CG2 displays is indicated generally by the reference numeral 500.

It is to be appreciated that some prior art approaches suffer the disadvantage that display properties of the different displays are not exploited, namely the colors are probably not as saturated as they could be on a CG2 display because of restrictions of the RCG display and vice versa.

To overcome this problem, an embodiment of the present principles provides a two step color correction. The color correction workflow 500 involves a content creation side 580 and a content consumer side 590. A RCG display 582 and a RCG display 584 are used on the content creation side 580. A RCG display 592 and a CG2 display 594 are used on the content consumer side 590. The RCG display 582 may be considered to be the main display for the content creation side 580 in the embodiment.

In a first step, the colors are corrected for the RCG display 582, by the color correction module 530. In a secondary color correction process, performed by the color correction module 535, the colorist is now given the ability to adjust the colors in a way to let him or her preserve the artistic intent on the CG2 display 584. This approach allows for a larger degree of freedom of controlled differences in colors between the two masters. As an option, the two displays can also be interchanged, making a first color correction on a CG2 display 584 and a second color correction on an RCG display 582. Between the first color correction 530 and the subsequent color correction 535, there is a color gamut circuitry 586 for preparing the content for the different display. It must be noted that there are other configurations possible, for example, where the color gamut circuitry is located between the subsequent color correction 535 and the CG2 display 584. It is even possible to do all the mapping manually.

The picture source content may be stored, for example, in a picture source content store 520. The color corrected picture content for RCG displays may be stored, for example, in a color corrected picture content store 540. The metadata 510 may be stored, for example, in a metadata store 517.

The master for the RCG displays is generated during an initial color correction, by an initial color correction module 530. The metadata 510 describes a transformation of content. The metadata 510, which is also referred to herein as combined metadata due to the methodology of its formation, is generated based on a color gamut mapping 586 involving a mapping specification from CG2 to RCG and subsequent color correction information (also referred to herein as sub color change metadata) from a subsequent color correction (performed by color correction module 535) with respect to the initial color correction (performed by color correction module 530) from which the master is generated. The combined metadata 510, formed by a final metadata generator 566, is provided to a consumer display device (e.g., CG2 display 594) which is then able to reconstruct the version for CG2 displays there from.

Figure 6:
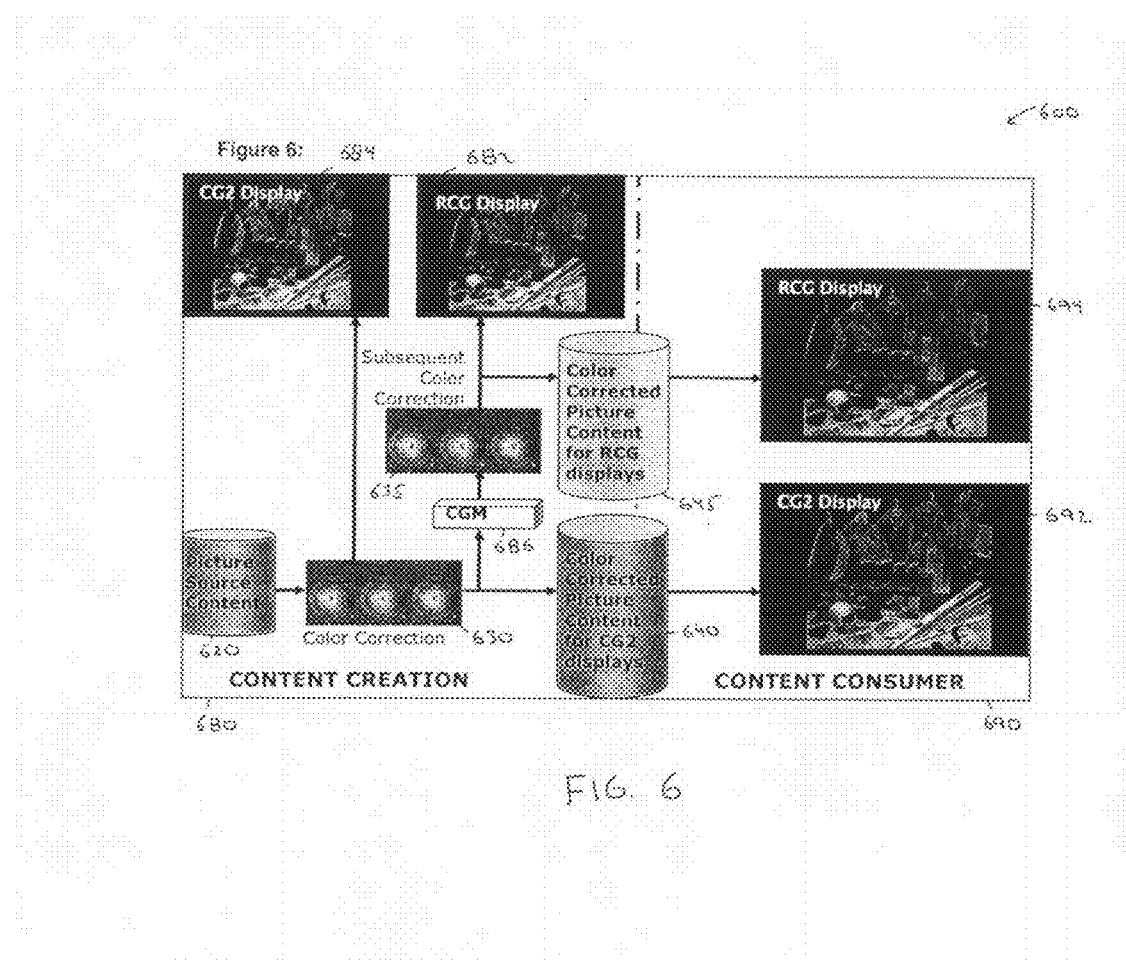
FIG. 6 is a high-level diagram showing the exemplary workflow for color correction to obtain a master for RCG displays and a master for CG2 displays, in accordance with an embodiment of the present principles.

Turning to FIG. 6, a high-level diagram showing the exemplary workflow for color correction to obtain a master for RCG displays and a master for CG2 displays is indicated generally by the reference numeral 600.

In an embodiment, one master is created for RCG displays, and a subsequent color correction is performed to create the secondary master for CG2 displays.

The color correction workflow 600 involves a content creation side 680 and a content consumer side 690. A RCG display 682 and a RCG display 684 are used on the content creation side 680. A RCG display 692 and a CG2 display 694 are used on the content consumer side 690. The RCG display 582 may be considered to be the main display for the content creation side 580 in the embodiment.

In a first step, the colors are corrected for the RCG display 682, by the color correction module 630. In a secondary color correction process, performed by the color correction module 635, the colorist is now given the ability to adjust the colors in a way to let him or her preserve the artistic intent on the CG2 display. This approach allows for a larger degree of freedom of controlled differences in colors between the two masters. As an option, the two displays can also be interchanged, making a first color correction on a CG2 display 684 and a second color correction on an RCG display 682. Between the first color correction and the subsequent color correction, there is a color gamut circuitry for preparing the content for the different display. It must be noted that there are other configurations possible, for instance, where the color gamut circuitry is located between the subsequent color correction and the CG2 display. It is even possible to do all the mapping manually. The two versions are then stored as separate masters.

The picture source content may be stored, for example, in a picture source content store 620. The color corrected picture content for RCG displays may be stored, for example, in a color corrected picture content store 645. The color corrected picture content for CG2 displays may be stored, for example, in a color corrected picture content store 640.

It is preferable to have one "mother" content and metadata describing the color transform that is necessary to retrieve the CG2 version needed, instead of having separate masters for different CG situations. On the content consumer side, circuitry will be provided that connects the signal source with a CG2 display. This circuitry can be implemented in hardware and/or in software, and provides the signal transform to generate the CG2 version needed out of the picture for RCG displays. The color transform specification is provided by means of metadata.

Figure 7:
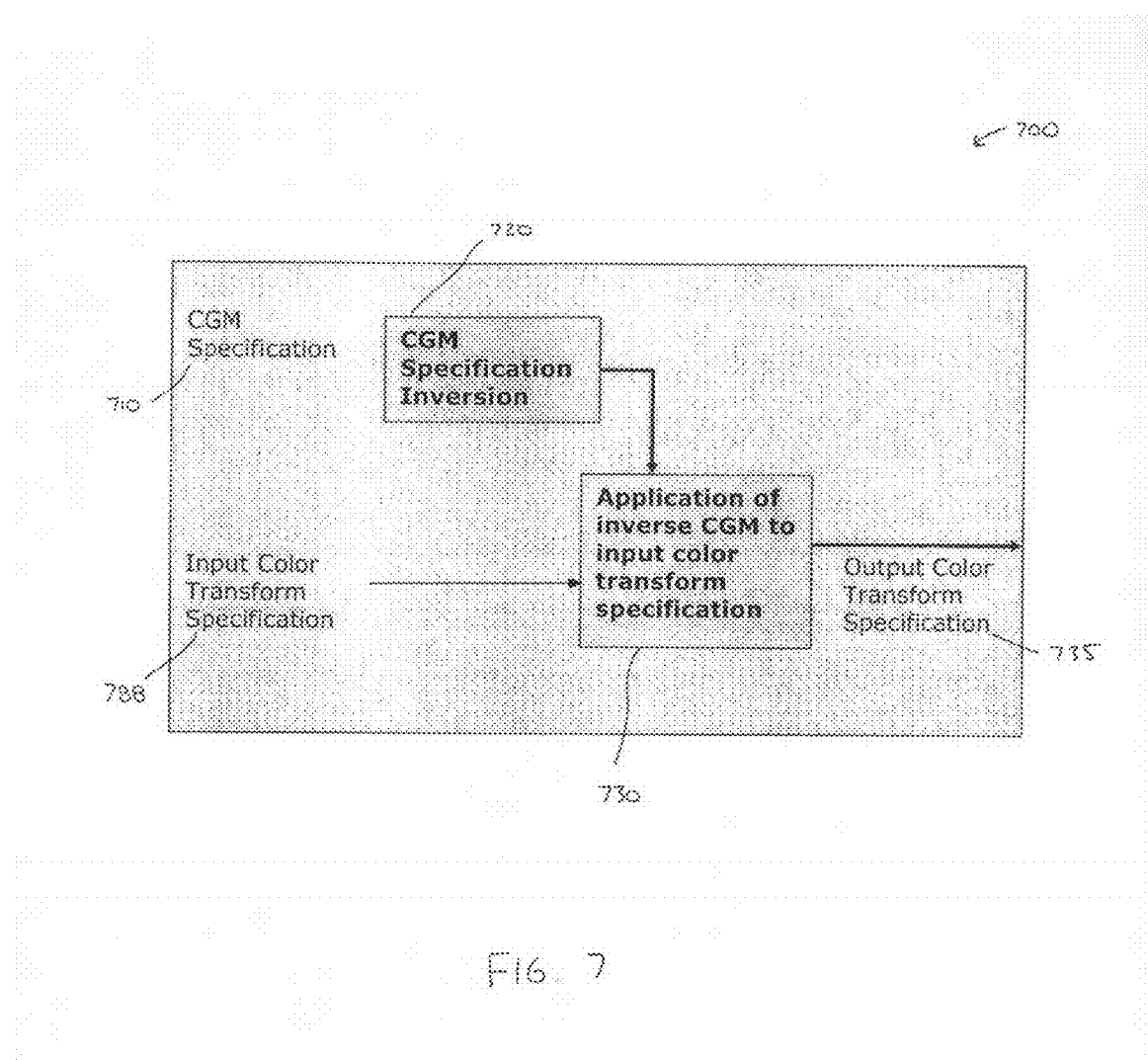
FIG. 7 is a diagram showing an exemplary combination to obtain an output color transformation, in accordance with an embodiment of the present principles.

The signal transform specification includes two major components, a specification of the color change from the subsequent color correction, and a specification of CG2 mapping (an inverse of the CG2 simulation specification used for color correction) (see FIG. 7).

Turning to FIG. 7, an exemplary combination to obtain an output color transformation is indicated generally by the reference numeral 700.

A color gamut mapping (CGM) specification 710 is input to an inverter module for outputting a color gamut mapping (CGM) specification inversion 720. The color gamut mapping (CGM) specification inversion 720 is input to an application module 730 for applying the inverse color gamut mapping (CGM) specification inversion 720 to an input color transform specification 688 to output a color transform specification 735.

In an exemplary application, where both transforms are realized as Look Up Tables, the resultant color transform specification will be a Look Up Table produced by inverting the Look Up Table that described the CG characteristic used during color correction. This Look Up Table is then concatenated with a Look Up Table generated from the color transform, where the color correction transform comes first and then the CG2 CGM.

Turning to FIG. 8, a high-level diagram showing the exemplary workflow for color correction to obtain a master for RCG displays and metadata for CG2 displays is indicated generally by the reference numeral 800.

The color correction workflow 800 involves a content creation side 580 and a content consumer side 890. A RCG display 882 and a RCG display 884 are used on the content creation side 880. A RCG display 892 and a CG2 display 894 are used on the content consumer side 890. The RCG display 882 may be considered to be the main display for the content creation side 880 in the embodiment.

The picture source content may be stored, for example, in a picture source content store 820. The color corrected picture content for RCG displays may be stored, for example, in a color corrected picture content store 840. The metadata 810 may be stored, for example, in a metadata store 817.

The master for the RCG displays is generated during an initial color correction, by an initial color correction module 830. The metadata 810 describes a transformation of content. The metadata 810, which is also referred to herein as combined metadata due to the methodology of its formation, is generated based on a color gamut mapping 886 involving the CG2 simulation specification and subsequent color correction information (also referred to herein as sub color change metadata) from a subsequent color correction (performed by color correction module 835) with respect to the initial color correction (performed by color correction module 830) from which the master is generated. The combined metadata 810, formed by a final metadata generator 866, is provided to a consumer display device (e.g., CG2 display 894) which is then able to reconstruct the version for CG2 displays there from.

Turning to FIG. 9, a high-level diagram showing the exemplary workflow for color correction to obtain a master for RCG displays and a master for CG2 displays is indicated generally by the reference numeral 900.

In an embodiment, one master is created for RCG displays, and a subsequent color correction is performed to create the secondary master for CG2 displays.

The color correction workflow 900 involves a content creation side 980 and a content consumer side 990. A RCG display 982 and a RCG display 984 are used on the content creation side 980. A RCG display 992 and a CG2 display 994 are used on the content consumer side 990. The RCG display 982 may be considered to be the main display for the content creation side 980 in the embodiment.

It is to be appreciated that some prior art approaches suffer the disadvantage that display properties of the different displays are not exploited, namely the colors are probably not as saturated as they could be on a CG2 display because of restrictions of the RCG display and vice versa.

To overcome this problem, an embodiment of the present principles provides a two step color correction. In a first step, the colors are corrected for the RCG display 982, by the color correction module 930. In a secondary color correction process, performed by the color correction module 935, the colorist is now given the ability to adjust the colors in a way to let him or her preserve the artistic intent on the CG2 display. However, in this scenario it is accepted that the two versions of the picture will not match. The two versions are then stored as separate masters.

The picture source content may be stored, for example, in a picture source content store 920. The color corrected picture content for RCG displays may be stored, for example, in a color corrected picture content store 945. The color corrected picture content for CG2 displays may be stored, for example, in a color corrected picture content store 940.

On the content consumer side, circuitry will be provided that connects the signal source with a CG2 display. This circuitry can be implemented in hardware and/or in software, and provides the signal transform to generate the CG2 version needed out of the picture for RCG displays These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. A method for color correcting, comprising:
performing an initial color correction on source picture content using a reference type display having a reference color gamut to obtain mastered color corrected picture content for display on reference type displays having the reference color gamut;
determining a first set of metadata defining a color gamut mapping specification for a color gamut mapping from a non-reference type display having a non-reference color gamut to the reference type display;
performing a subsequent color correction using the non-reference type display and the mastered color corrected picture content to create a second set of metadata directed to non-reference type displays having the non-reference color gamut;
generating a final set of metadata from the first set of metadata and the second set of metadata, for a subsequent color transform that color transforms the mastered color corrected picture content for display on non-reference type displays for consumer consumption,
wherein the source picture content is mastered for consumer consumption only for the reference type displays having the reference color gamut.

2. The method of claim 1, wherein at least one of the first set of metadata, the second set of metadata, and the final set of metadata are represented by respective look up tables.

3. The method of claim 2, wherein the look up table representing the final set of metadata is formed by concatenating an inverted version of the look up table representing the second set of metadata the look up table representing the first set of metadata.

4. The method of claim 1, wherein said performing steps, said determining step, and said generating step relate to a creation of the display content for subsequent consumer consumption.

5. The method of claim 1, wherein the final set of metadata is provided to a final consumption display at least one of in-band and out-of-band with respect to the mastered display content.

6. The method of claim 1, wherein the reference type displays and the non-reference type displays are at least one of liquid crystal displays, plasma displays, cathode ray tube displays, digital light processing displays, organic light emitting diode displays, liquid crystal on silicon displays, and direct drive image light amplifier displays.

7. A method for color correcting, comprising:
performing an initial color correction on source picture content using a non-reference type display having a non-reference color gamut to obtain mastered color corrected picture content for display on non-reference type displays having the non-reference color gamut and to obtain initial color correction data directed to reference type displays having a reference color gamut;
performing a color gamut mapping using the initial color correction data and the mastered color corrected picture content to modify the mastered color corrected picture content for display on a reference type display having the reference color gamut; and
performing a subsequent color correction using the reference type display having the reference color gamut and the modified mastered color corrected picture content to obtain mastered color corrected picture content for display on the reference type displays having the reference color gamut.

8. The method of claim 7, wherein the mastered color corrected picture content for display on the reference type displays having the reference color gamut is used directly by a consumer device.

9. The method of claim 7, wherein the mastered color corrected picture content for display on the reference type displays having the reference color gamut is reconstructed by a consumer device before use by the consumer device, using metadata and the mastered color corrected picture content for display on the non-reference type displays having the non-reference color gamut.

10. The method of claim 7, wherein the reference type displays and the non-reference type displays are at least one of liquid crystal displays, plasma displays, cathode ray tube displays, digital light processing displays, organic light emitting diode displays, liquid crystal on silicon displays, and direct drive image light amplifier displays.

11. A method for color correcting, comprising:
performing an initial color correction on source picture content using a reference type display having a reference color gamut to obtain mastered color corrected picture content for display on reference type displays having the reference color gamut;
performing a subsequent color correction using a non-reference type display having a non-reference color gamut and the mastered color corrected picture content to create a first set of metadata directed to non-reference type displays having the non-reference color gamut;
determining a second set of metadata defining a color gamut mapping specification from a non-reference type display to the reference type display; and
generating a final set of metadata from the first set of metadata and the second set of metadata, for a subsequent color transform that color transforms the mastered color corrected picture content for display on non-reference type displays for consumer consumption,
wherein the source picture content is mastered for consumer consumption only for the reference type displays having the reference color gamut.

12. The method of claim 11, wherein at least one of the first set of metadata, the second set of metadata, and the final set of metadata are represented by respective look up tables.

13. The method of claim 12, wherein the look up table representing the final set of metadata is formed by concatenating an inverted version of the look up table representing the second set of metadata the look up table representing the first set of metadata.

14. The method of claim 11, wherein said performing steps, said determining step, and said generating step relate to a creation of the display content for subsequent consumer consumption.

15. The method of claim 11, wherein the final set of metadata is provided to a final consumption display at least one of in-band and out-of-band with respect to the mastered display content.

16. The method of claim 11, wherein the reference type displays and the non-reference type displays are at least one of liquid crystal displays, plasma displays, cathode ray tube displays, digital light processing displays, organic light emitting diode displays, liquid crystal on silicon displays, and direct drive image light amplifier displays.

17. A method for color correcting, comprising:
performing an initial color correction on source picture content using a reference type display having a reference color gamut to obtain mastered color corrected picture content for display on reference type displays having the reference color gamut;
performing a subsequent color correction using a non-reference type display having a non-reference color gamut and the mastered color corrected picture content for display on the reference type displays having the reference color gamut to obtain subsequent color correction data; and
performing a color gamut mapping using the subsequent color correction data and the mastered color corrected picture content for display on reference type displays having the reference color gamut to obtain mastered color corrected picture content for display on non-reference type displays having the non-reference color gamut.

18. The method of claim 17, wherein the mastered color corrected picture content for display on the reference type displays having the reference color gamut is used directly by a consumer device.

19. The method of claim 17, wherein the mastered color corrected picture content for display on the reference type displays having the reference color gamut is reconstructed by a consumer device before use by the consumer device, using metadata and the mastered color corrected picture content for display on the non-reference type displays having the non-reference color gamut.

20. The method of claim 17, wherein the reference type displays and the non-reference type displays are at least one of liquid crystal displays, plasma displays, cathode ray tube displays, digital light processing displays, organic light emitting diode displays, liquid crystal on silicon displays, and direct drive image light amplifier displays.

21. A system for color correcting, comprising:
a color correction module for performing an initial color correction on source picture content using a reference type display having a reference color gamut to obtain mastered color corrected picture content for display on reference type displays having the reference color gamut;
a color gamut mapping module for performing a color gamut mapping to generate a first set of metadata defining a color gamut mapping specification for a color gamut mapping from a non-reference type display having a non-reference color gamut to the reference type display;
a subsequent color correction module for performing a subsequent color correction using the non-reference type display and the mastered color corrected picture content to create a second set of metadata directed to non-reference type displays having the non-reference color gamut;

a final set metadata generator for generating a final set of metadata from the first set of metadata and the second set of metadata, for a subsequent color transform that color transforms the mastered color corrected picture content for display on non-reference type displays for consumer consumption, wherein the source picture content is mastered for consumer consumption only for the reference type displays having the reference color gamut.

22. The system of claim 21, wherein the final set of metadata is generated without generating any other mastered content other than the mastered color corrected picture content for display on reference type displays.

23. The system of claim 21, wherein at least one of the first set of metadata, the second set of metadata, and the final set of metadata are represented by respective look up tables.

24. The system of claim 23, wherein the look up table representing the final set of metadata is formed by concatenating an inverted version of the look up table representing the second set of metadata the look up table representing the first set of metadata.

25. The system of claim 21, wherein the final set of metadata is provided to a final consumption display at least one of in-band and out-of-band with respect to the mastered display content.

26. The system of claim 21, wherein the reference type displays and the non-reference type displays are at least one of liquid crystal displays, plasma displays, cathode ray tube displays, digital light processing displays, organic light emitting diode displays, liquid crystal on silicon displays, and direct drive image light amplifier displays.

27. The system of claim 21, wherein the color correction module and the subsequent color correction module are comprised in a single entity.

28. A system for color correcting, comprising:
a color correction module for performing an initial color correction on source picture content using a non-reference type display having a non-reference color gamut to obtain mastered color corrected picture content for display on non-reference type displays having the non-reference color gamut and to obtain initial color correction data directed to reference type displays having a reference color gamut;
a color gamut mapping module for performing a color gamut mapping using the initial color correction data and the mastered color corrected picture content to modify the mastered color corrected picture content for display on a reference type display having the reference color gamut; and
a subsequent color correction module for performing a subsequent color correction using the reference type display having the reference color gamut and the modified mastered color corrected picture content to obtain mastered color corrected picture content for display on the reference type displays having the reference color gamut.

29. The system of claim 28, wherein the mastered color corrected picture content for display on the reference type displays having the reference color gamut is used directly by a consumer device.

30. The system of claim 28, wherein the mastered color corrected picture content for display on the reference type displays having the reference color gamut is reconstructed by a consumer device before use by the consumer device, using metadata and the mastered color corrected picture content for display on the non-reference type displays having the non-reference color gamut.

31. The system of claim 28, wherein the reference type displays and the non-reference type displays are at least one of liquid crystal displays, plasma displays, cathode ray tube displays, digital light processing displays, organic light emitting diode displays, liquid crystal on silicon displays, and direct drive image light amplifier displays.

32. The system of claim 28, wherein the color correction module and the subsequent color correction module are comprised in a single entity.

33. A system for color correcting, comprising:
a color correction module for performing an initial color correction on source picture content using a reference type display having a reference color gamut to obtain mastered color corrected picture content for display on reference type displays having the reference color gamut;
a subsequent color correction module for performing a subsequent color correction using a non-reference type display having a non-reference color gamut and the mastered color corrected picture content to create a first set of metadata directed to non-reference type displays having the non-reference color gamut;
a color gamut mapping module for performing a color gamut mapping to generate a second set of metadata defining a color gamut mapping specification from a non-reference type display to the reference type display; and
a final set metadata generator for generating a final set of metadata from the first set of metadata and the second set of metadata, for a subsequent color transform that color transforms the mastered color corrected picture content for display on non-reference type displays for consumer consumption,
wherein the source picture content is mastered for consumer consumption only for the reference type displays having the reference color gamut.

34. The system of claim 33, wherein the final set of metadata is generated without generating any other mastered content other than the mastered color corrected picture content for display on reference type displays.

35. The system of claim 33, wherein at least one of the first set of metadata, the second set of metadata, and the final set of metadata are represented by respective look up tables.

36. The system of claim 35, wherein the look up table representing the final set of metadata is formed by concatenating an inverted version of the look up table representing the second set of metadata the look up table representing the first set of metadata.

37. The system of claim 33, wherein the final set of metadata is provided to a final consumption display at least one of in-band and out-of-band with respect to the mastered display content.

38. The system of claim 33, wherein the reference type displays and the non-reference type displays are at least one of liquid crystal displays, plasma displays, cathode ray tube displays, digital light processing displays, organic light emitting diode displays, liquid crystal on silicon displays, and direct drive image light amplifier displays.

39. The system of claim 33, wherein the color correction module and the subsequent color correction module are comprised in a single entity.

40. A system for color correcting, comprising:
a color correction module for performing an initial color correction on source picture content using a reference type display having a reference color gamut to obtain mastered color corrected picture content for display on reference type displays having the reference color gamut;

a subsequent color correction module for performing a subsequent color correction using a non-reference type display having a non-reference color gamut and the mastered color corrected picture content for display on the reference type displays having the reference color gamut to obtain subsequent color correction data; and a color gamut mapping module for performing a color gamut mapping using the subsequent color correction data and the mastered color corrected picture content for display on reference type displays having the reference color gamut to obtain mastered color corrected picture content for display on non-reference type displays having the non-reference color gamut.

41. The system of claim 40, wherein the mastered color corrected picture content for display on the reference type displays having the reference color gamut is used directly by a consumer device.

42. The system of claim 40, wherein the mastered color corrected picture content for display on the reference type displays having the reference color gamut is reconstructed by a consumer device before use by the consumer device, using metadata and the mastered color corrected picture content for display on the non-reference type displays having the non-reference color gamut.

43. The system of claim 40, wherein the reference type displays and the non-reference type displays are at least one of liquid crystal displays, plasma displays, cathode ray tube displays, digital light processing displays, organic light emitting diode displays, liquid crystal on silicon displays, and direct drive image light amplifier displays.

44. The system of claim 40, wherein the color correction module and the subsequent color correction module are comprised in a single entity.

45. A system for color correcting, comprising:
means for performing an initial color correction on source picture content using a reference type display having a reference color gamut to obtain mastered color corrected picture content for display on reference type displays having the reference color gamut;
means for determining a first set of metadata defining a color gamut mapping specification for a color gamut mapping from a non-reference type display having a non-reference color gamut to the reference type display;
means for performing a subsequent color correction using the non-reference type display and the mastered color corrected picture content to create a second set of metadata directed to non-reference type displays having the non-reference color gamut; and
means for generating a final set of metadata from the first set of metadata and the second set of metadata, for a subsequent color transform that color transforms the mastered color corrected picture content for display on non-reference type displays for consumer consumption,
wherein the source picture content is mastered for consumer consumption only for the reference type displays having the reference color gamut.

46. The system of claim 45, wherein at least one of the first set of metadata, the second set of metadata, and the final set of metadata are represented by respective look up tables.

47. The system of claim 46, wherein the look up table representing the final set of metadata is formed by concatenating an inverted version of the look up table representing the second set of metadata the look up table representing the first set of metadata.

48. The system of claim 45, wherein both of said means for performing, said means for determining, and said means for generating relate to a creation of the display content for subsequent consumer consumption.

49. The system of claim 45, wherein the final set of metadata is provided to a final consumption display at least one of in-band and out-of-band with respect to the mastered display content.

50. The system of claim 45, wherein the reference type displays and the non-reference type displays are at least one of liquid crystal displays, plasma displays, cathode ray tube displays, digital light processing displays, organic light emitting diode displays, liquid crystal on silicon displays, and direct drive image light amplifier displays.

51. A system for color correcting, comprising:
means for performing an initial color correction on source picture content using a non-reference type display having a non-reference color gamut to obtain mastered color corrected picture content for display on non-reference type displays having the non-reference color gamut and to obtain initial color correction data directed to reference type displays having a reference color gamut;
means for performing a color gamut mapping using the initial color correction data and the mastered color corrected picture content to modify the mastered color corrected picture content for display on a reference type display having the reference color gamut; and
means for performing a subsequent color correction using the reference type display having the reference color gamut and the modified mastered color corrected picture content to obtain mastered color corrected picture content for display on the reference type displays having the reference color gamut.

52. The system of claim 51, wherein the mastered color corrected picture content for display on the reference type displays having the reference color gamut is used directly by a consumer device.

53. The system of claim 51, wherein the mastered color corrected picture content for display on the reference type displays having the reference color gamut is reconstructed by a consumer device before use by the consumer device, using metadata and the mastered color corrected picture content for display on the non-reference type displays having the non-reference color gamut.

54. The system of claim 51, wherein the reference type displays and the non-reference type displays are at least one of liquid crystal displays, plasma displays, cathode ray tube displays, digital light processing displays, organic light emitting diode displays, liquid crystal on silicon displays, and direct drive image light amplifier displays.

55. A system for color correcting, comprising:
means for performing an initial color correction on source picture content using a reference type display having a reference color gamut to obtain mastered color corrected picture content for display on reference type displays having the reference color gamut;
means for performing a subsequent color correction using a non-reference type display having a non-reference color gamut and the mastered color corrected picture content to create a first set of metadata directed to non-reference type displays having the non-reference color gamut;

means for determining a second set of metadata defining a color gamut mapping specification from a non-reference type display to the reference type display; and means for generating a final set of metadata from the first set of metadata and the second set of metadata, for a subsequent color transform that color transforms the mastered color corrected picture content for display on non-reference type displays for consumer consumption, wherein the source picture content is mastered for consumer consumption only for the reference type displays having the reference color gamut.

56. The system of claim 55, wherein at least one of the first set of metadata, the second set of metadata, and the final set of metadata are represented by respective look up tables.

57. The system of claim 56, wherein the look up table representing the final set of metadata is formed by concatenating an inverted version of the look up table representing the second set of metadata the look up table representing the first set of metadata.

58. The system of claim 55, wherein both of said means for performing, said means for determining, and said means for generating relate to a creation of the display content for subsequent consumer consumption.

59. The system of claim 55, wherein the final set of metadata is provided to a final consumption display at least one of in-band and out-of-band with respect to the mastered display content.

60. The system of claim 55, wherein the reference type displays and the non-reference type displays are at least one of liquid crystal displays, plasma displays, cathode ray tube displays, digital light processing displays, organic light emitting diode displays, liquid crystal on silicon displays, and direct drive image light amplifier displays.

61. A system for color correcting, comprising:

means or performing an initial color correction on source picture content using a reference type display having a reference color gamut to obtain mastered color corrected picture content for display on reference type displays having the reference color gamut;

means for performing a subsequent color correction using a non-reference type display having a non-reference color gamut and the mastered color corrected picture content for display on the reference type displays having the reference color gamut to obtain subsequent color correction data; and means for performing a color gamut mapping using the subsequent color correction data and the mastered color corrected picture content for display on reference type displays having the reference color gamut to obtain mastered color corrected picture content for display on non-reference type displays having the non-reference color gamut.

62. The system of claim 61, wherein the mastered color corrected picture content for display on the reference type displays having the reference color gamut is used directly by a consumer device.

63. The system of claim 61, wherein the mastered color corrected picture content for display on the reference type displays having the reference color gamut is reconstructed by a consumer device before use by the consumer device, using metadata and the mastered color corrected picture content for display on the non-reference type displays having the non-reference color gamut.

64. The system of claim 61, wherein the reference type displays and the non-reference type displays are at least one of liquid crystal displays, plasma displays, cathode ray tube displays, digital light processing displays, organic light emitting diode displays, liquid crystal on silicon displays, and direct drive image light amplifier displays.

* * * * *